US011757110B2

(12) United States Patent
Moghimi et al.

(10) Patent No.: US 11,757,110 B2
(45) Date of Patent: Sep. 12, 2023

(54) METHOD FOR OPERATING A FUEL CELL AND CONTROLLER THEREFORE (71) Applicant: Intelligent Energy Limited, Loughborough (GB)

(72) Inventors: Shahin Moghimi, Loughborough (GB); Nathaniel Thomas Palmer, Loughborough (GB); Pratap Rama, Loughborough (GB); Alex Mark Thirkell, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 706 days.

(21) Appl. No.: 16/636,498

(22) PCT Filed: Aug. 4, 2017

(86) PCT No.: PCT/GB2017/052308
§ 371 (c)(1),
(2) Date: Feb. 4, 2020

(87) PCT Pub. No.: WO2019/025746
PCT Pub. Date: Feb. 7, 2019

(65) Prior Publication Data
US 2020/0259191 A1      Aug. 13, 2020

(51) Int. Cl.
*H01M 8/04029* (2016.01)
*H01M 8/0267* (2016.01)
*H01M 8/04223* (2016.01)
*H01M 8/04701* (2016.01)
*H01M 8/04746* (2016.01)
*H01M 8/04858* (2016.01)
*H01M 8/04955* (2016.01)

(52) U.S. Cl.
CPC ..... *H01M 8/04029* (2013.01); *H01M 8/0267* (2013.01); *H01M 8/0488* (2013.01);
(Continued)

(58) Field of Classification Search
CPC ........... H01M 8/0267; H01M 8/04029; H01M 8/04253; H01M 8/04723; H01M 8/04753;
(Continued)

(56) References Cited

U.S. PATENT DOCUMENTS

2004/0224191 A1    11/2004  Skiba
2012/0082914 A1*   4/2012   Rainville .......... H01M 8/04955
                                                           429/429

(Continued)

FOREIGN PATENT DOCUMENTS

GB      2532930 A       6/2016
JP      2009-200005 A   9/2009
(Continued)

OTHER PUBLICATIONS

International Search Report dated Aug. 2, 2018 in International Patent Application No. PCT/GB2017/052308.
(Continued)

*Primary Examiner* — Brittany L Raymond
(74) *Attorney, Agent, or Firm* — BAKER HOSTETLER LLP (57) ABSTRACT A method for operating a fuel cell system comprising a fuel cell assembly of a plurality of fuel cells configured to generate electrical power from a fuel flow and an oxidant flow to the plurality of fuel cells, the fuel cell assembly arranged in combination with a coolant storage module configured to supply the fuel cell assembly with a flow of coolant, the method performed when the temperature of the coolant in the coolant storage module is below a coolant temperature threshold and comprises; a first phase performed prior to activation of a coolant pump configured to deliver coolant from the coolant storage module to the fuel cell assembly and a second phase performed after activation of the coolant pump.

8 Claims, 2 Drawing Sheets (52) U.S. Cl.
CPC ..... *H01M 8/0494* (2013.01); *H01M 8/04253* (2013.01); *H01M 8/04723* (2013.01); *H01M 8/04768* (2013.01); *H01M 8/04955* (2013.01); *H01M 2250/20* (2013.01)

(58) Field of Classification Search
CPC ............. H01M 8/0488; H01M 8/0494; H01M 8/04955
See application file for complete search history.

(56) References Cited

U.S. PATENT DOCUMENTS

| | | |
|---|---|---|
| 2014/0120440 A1 | 5/2014 | Nolan et al. |
| 2016/0372768 A1 | 12/2016 | Procter et al. |
| 2017/0309929 A1 | 10/2017 | Moghimi et al. |

FOREIGN PATENT DOCUMENTS

| | | | |
|---|---|---|---|
| JP | 2018-501610 A | | 1/2018 |
| WO | 2008057085 | | 5/2008 |
| WO | 2015177507 | | 11/2015 |
| WO | 2016083813 | | 6/2016 |
| WO | WO 2016-083813 | * | 6/2016 |

OTHER PUBLICATIONS

International Written Opinion dated Aug. 2, 2018 in International Patent Application No. PCT/GB2017/052308.
International Patent Application No. PCT/GB2017/052308; Int'l Preliminary Report on Patentability; dated Feb. 4, 2020; 20 pages.

* cited by examiner

METHOD FOR OPERATING A FUEL CELL AND CONTROLLER THEREFORE

CROSS-REFERENCE TO RELATED APPLICATIONS

This application is a 371 U.S. National Stage Application of International Patent Application No. PCT/GB2017/052308 filed Aug. 4, 2017, the entire contents of which are incorporated by reference herein.

TECHNICAL FIELD

This disclosure relates generally to a fuel cell and a coolant storage tank.

BACKGROUND

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, such as hydrogen and the oxidant, such as oxygen from air are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

It is important that the polymeric ion transfer membrane remains hydrated for efficient operation. It is also important that the temperature of the stack is controlled. Thus, coolant may be supplied to the stack for cooling and/or hydration. Accordingly a fuel cell system may include a water/coolant storage module for storing water for hydration and/or cooling of the fuel cell stack, for example. If the fuel cell system is stored or operated in sub-zero conditions, the water in the fuel cell stack and water storage module may freeze. The frozen water may cause blockages that hinder the supply of coolant or hydration water to the fuel cell stack. This is a particular problem when the fuel cell system is off and therefore water in the water storage module is no longer heated by its passage through the stack and may freeze completely. In such an event sufficient liquid water may not be available for hydration and/or cooling. This may prevent the fuel cell assembly from being restarted or operating at full power until the frozen water has been thawed. It is known to provide a heater in the fuel cell system, which operates on stored energy, such as from a battery, and maintains the fuel cell system at above-zero temperatures to prevent freezing occurring. The battery power is, however, limited and the fuel cell system may experience freezing if the battery fails or becomes discharged.

SUMMARY

According to a some aspect of the invention, disclose a method for operating a fuel cell system comprising a fuel cell assembly of a plurality of fuel cells configured to generate electrical power from a fuel flow and an oxidant flow to the plurality of fuel cells, the fuel cell assembly arranged in combination with a coolant storage module configured to supply the fuel cell assembly with a flow of coolant, and including one or more heaters configured to heat frozen coolant of the coolant storage module and a compressor configured to provide the flow of oxidant and/or the flow of fuel, the method performed following activation of one or more of the heaters and the compressor, the method comprising;

based on a low performance threshold comprising (a) a voltage across the fuel cells of the fuel cell assembly being below a first predetermined assembly voltage threshold and/or (b) a voltage of one or more of the fuel cells being below a first cell voltage threshold;

performing a first recovery routine comprising deactivating one or more of the activated heaters;

provided that, within a first predetermined time, a recovery threshold is met comprising (a) a voltage across the fuel cells of the fuel cell assembly is above a second predetermined assembly voltage threshold and/or (b) a voltage of one or more of the fuel cells is above a second cell voltage threshold, perform a heater activation procedure that includes activating one or more of the heaters;

otherwise performing a further recovery routine comprising decreasing power supplied to the compressor before continuing to provide heat to the coolant storage module.

This is advantageous as by operating the heaters of the fuel cell in response to a low performance threshold, heating of the coolant can be effectively maintained without jeopardising the health of the fuel cell system. Further, control of the compressor following failure to meet a recovery threshold has been found to be an effective way of recovering from the conditions associated with a low performing fuel cell assembly.

The second predetermined assembly voltage threshold may be the same as the first predetermined assembly voltage threshold. The second cell voltage threshold may be higher than the first cell voltage threshold.

While we define the low performance threshold in terms of the voltage across the fuel cells being below a first predetermined assembly voltage threshold and/or the voltage of one or more of the fuel cells being below a first cell voltage threshold, it will be appreciated that in other unclaimed examples, a different low performance threshold may be used to determine whether or not to proceed to the first and/or further recovery routine.

In one or more exemplars, the further recovery routine further comprises waiting a second predetermined time; and
provided that, within a second predetermined time, (a) a voltage across the fuel cells of the fuel cell assembly is above a third predetermined assembly voltage threshold and/or (b) a voltage of one or more of the fuel cells is above a third cell voltage threshold, perform the heater activation procedure; otherwise
limit the electrical output of the fuel cell assembly.

The third predetermined assembly voltage threshold may be the same as the first and second predetermined assembly voltage thresholds. The third cell voltage threshold may be higher than the first cell voltage threshold and/or same as the second cell voltage threshold.

In one or more exemplars, limiting the electrical output comprises shutting down the fuel cell system.

In one or more exemplars, the method is performed following activation of a plurality of heaters and the first recovery routine comprises deactivating one of or a subset of the plurality of heaters. In one or more examples, the method is performed following activation of a plurality of heaters and the first recovery routine comprises progressively deactivating the plurality of heaters.

In one or more exemplars, the method includes a second recovery routine performed if the low performance threshold is met for a second time, the second recovery routine comprising deactivating one or more of the activated heaters and provided that, within a third predetermined time, a second recovery threshold is met comprising (a) a voltage across the fuel cells of the fuel cell assembly is above a fourth predetermined assembly voltage threshold and/or (b) a voltage of one or more of the fuel cells is above a fourth cell voltage threshold, perform a heater activation procedure that includes activating one or more of the heaters; otherwise provide for reduction in the electrical load on the fuel cell system.

The fourth predetermined assembly voltage threshold may be the same as the first and second and third predetermined assembly voltage threshold. The fourth cell voltage threshold may be higher than the first cell voltage threshold.

In one or more examples, providing for reduction in the electrical load on the fuel cell system may comprise performing the further recovery routine.

In one or more examples, the further recovery routine is performed on the condition that (a) a voltage across the fuel cells of the fuel cell assembly is less than a fifth predetermined assembly voltage threshold or (b) a voltage of one or more of the fuel cells is less than a fifth cell voltage threshold for a predetermined time.

The fifth predetermined assembly voltage threshold may be lower than any one or all of the first to fourth predetermined assembly voltage thresholds. The fifth cell voltage threshold may be the same as the first cell voltage threshold.

In one or more examples, each time the low performance threshold is met and the corresponding recovery threshold is met, the method comprises waiting a longer predetermined before performing a heater activation procedure that includes activating one or more of the heaters In one or more exemplars of the disclosure, the method is performed until one or more of the following conditions is satisfied;
  the temperature of the coolant in the coolant storage module is above a predetermined temperature threshold;
  the energy provided to the heaters since their activation reaches or exceeds a predetermined heater energy threshold;
the time since the activation of the heaters reaches or exceeds a predetermined heater time threshold;
  the temperature of cathode exhaust exceeds a predetermined cathode exhaust temperature threshold;
  the low performance threshold is met for a predetermined number of times;
a time-out period is reached.

In one or more examples, the method is performed in one or more of the following conditions;
  i) prior to any coolant being available to the fuel cell system from the coolant storage module;
  ii) a temperature of the fuel cell system or its ambient environment being below a temperature threshold;
  iii) prior to activation of a coolant pump configured to pump coolant from the coolant storage module;
  iv) until a measure of the energy provided to coolant storage module reaches or exceeds a predetermined energy-in threshold;
  v) until the time over which power is supplied to the heaters reaches or exceeds a predetermined energy-in time threshold;
  vi) the temperature of the oxidant flow leaving the fuel cell system reaches or exceeds a predetermined cathode temperature threshold.

In one or more examples, the compressor is configured to provide the flow of oxidant.

According to a some aspect of the disclosure we provide a method for operating a fuel cell system comprising a fuel cell assembly of a plurality of fuel cells configured to generate electrical power from a fuel flow and an oxidant flow to the plurality of fuel cells, the fuel cell assembly arranged in combination with a coolant storage module configured to supply the fuel cell assembly with a flow of coolant, the method performed (a) following activation of a coolant pump configured to deliver coolant from the coolant storage module to the fuel cell assembly and (b) when the temperature of the coolant in the coolant storage module is below a coolant temperature threshold, the method comprising;
  activating of one or more heaters configured to heat frozen coolant of the coolant storage module; and
  based on (a) a voltage across the fuel cells of the fuel cell assembly being below a first predetermined assembly voltage threshold and/or (b) a voltage of one or more of the fuel cells being below a first cell voltage threshold;
  limiting the electrical output of the fuel cell assembly and provide for heating of coolant in the coolant storage module at least by returning coolant heated by operation of the fuel cell assembly to the coolant storage module to impart at least some of its energy to the coolant therein.

In one or more exemplar, the step of limiting the electrical output comprises deactivating one or more of the one or more heaters.

In one or more exemplar, the step of limiting the electrical output comprises deactivating one or more of the one or more heaters in combination with limiting the electrical output provided to a load configured to be powered by the fuel cell system.

In one or more exemplars, the method comprises;
  on detection of temperature of the coolant in the coolant storage module reaching or exceeding the coolant temperature threshold, performing one or more of the following;
increasing the flow rate provided by the coolant pump;
  adjusting the oxidant flow rate and the fuel flow rate to satisfy a predetermined stoichiometric ratio; and
  deactivating the one or more heaters.

In one or more examples, the method comprises, following activation of the one or more heaters, and subject to (a) a voltage across the fuel cells of the fuel cell assembly being above the first predetermined assembly voltage threshold and/or (b) a voltage of one or more of the fuel cells being above the first cell voltage threshold;
  deactivating the one or more heaters once a predetermined condition is true, the predetermined condition being true when;
  the energy provided to the one or more heaters since their activation reaches or exceeds a predetermined heater energy threshold and the time since their activation reaches or exceeds a predetermined heater time threshold; or
  the temperature of the coolant in the coolant storage module reaches or exceeds the coolant temperature threshold.

According to a some aspects of the disclosure, we provide a method of operating a fuel cell system comprising a fuel cell assembly of a plurality of fuel cells configured to generate electrical power from a fuel flow and an oxidant flow to the plurality of fuel cells, the fuel cell assembly arranged in combination with a coolant storage module configured to supply the fuel cell assembly with a flow of coolant, the method performed when the temperature of the coolant in the coolant storage module is below a coolant temperature threshold and comprises a first phase performed prior to activation of a coolant pump configured to deliver coolant from the coolant storage module to the fuel cell assembly and a second phase performed after activation of the coolant pump, the method comprising;

in the first phase, activating a plurality of heaters configured to heat coolant in the coolant storage module and monitoring the electrical performance of the fuel cell assembly and if the electrical performance satisfies a low performance threshold, deactivating one or more of the plurality of heaters while providing at least one active heater; and in the second phase, activating one or more heaters configured to heat coolant in the coolant storage module and monitoring the electrical performance of the fuel cell assembly and if the electrical performance satisfies a further low performance threshold, deactivating one or more heaters and provide for heating of coolant in the coolant storage module at least by returning coolant heated by operation of the fuel cell assembly to the coolant storage module to impart at least some of its energy to the coolant therein.

In one or more examples, the first phase includes controlling a compressor configured to provide the oxidant flow to the fuel cell assembly to reduce the electrical load on the fuel cell assembly.

In one or more examples, the first and/or second phase includes, following deactivation of the one or more of the plurality of heaters, monitoring the electrical performance of the fuel cell assembly and if the electrical performance satisfies a still further low performance threshold, shutting down the fuel cell system.

According to a some aspects of the disclosure, we provide a controller for a fuel cell system comprising a fuel cell assembly of a plurality of fuel cells configured to generate electrical power from a fuel flow and an oxidant flow to the plurality of fuel cells, the fuel cell assembly arranged in combination with a coolant storage module configured to supply the fuel cell assembly with a flow of coolant, the coolant storage module associated with one or more heater(s) for heating the coolant stored therein, the controller configured to operate in accordance with the method of any preceding aspect.

According to some aspects of the disclosure, we provide a fuel cell system comprising a fuel cell assembly of a plurality of fuel cells configured to generate electrical power from a fuel flow and an oxidant flow to the plurality of fuel cells, the fuel cell assembly arranged in combination with a coolant storage module configured to supply the fuel cell assembly with a flow of coolant, the coolant storage module associated with one or more heater(s) for heating the coolant stored therein, the fuel cell system configured to operate in accordance with the method of any of the first, second or third aspects.

It will be appreciated that in some aspects, the fuel cell assembly may include a compressor configured to provide the flow of oxidant and/or the flow of fuel.

According to some aspects of the disclosure, we provide a computer program or a computer program product comprising computer program code which when executed on a processor having memory provides for the performance of the method of any of the first, second or third aspects.

BRIEF DESCRIPTION OF THE DRAWINGS

The present application is further understood when read in conjunction with the appended drawings. For the purpose of illustrating the subject matter, there are shown in the drawings exemplary implementations of the subject matter; however, the presently disclosed subject matter is not limited to the specific methods, devices, and systems disclosed. Furthermore, the drawings are not necessarily drawn to scale. In the drawings.

Figure 1:
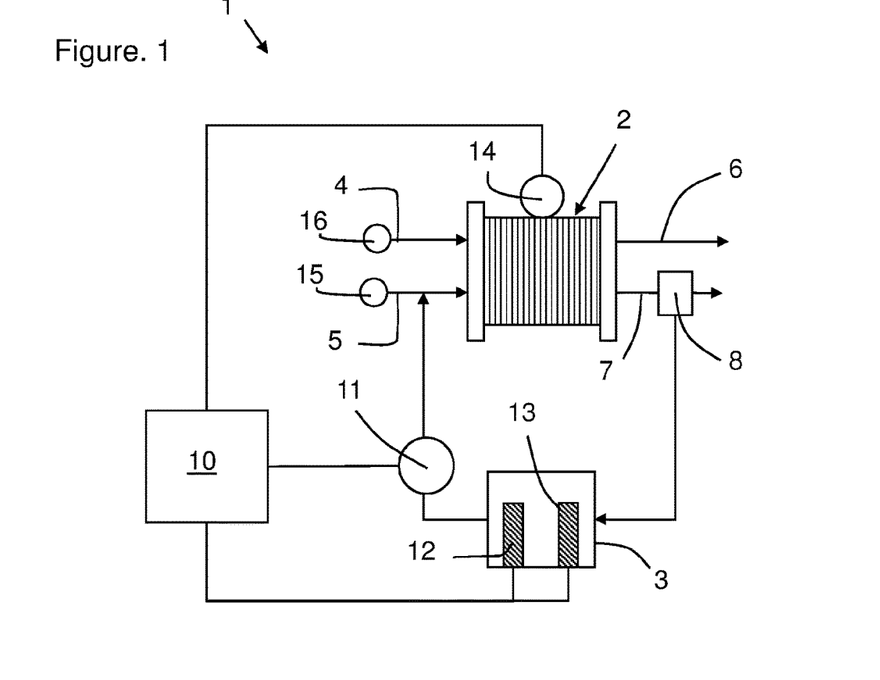
FIG. 1 shows a schematic diagram of a fuel cell system.
Figure 2:
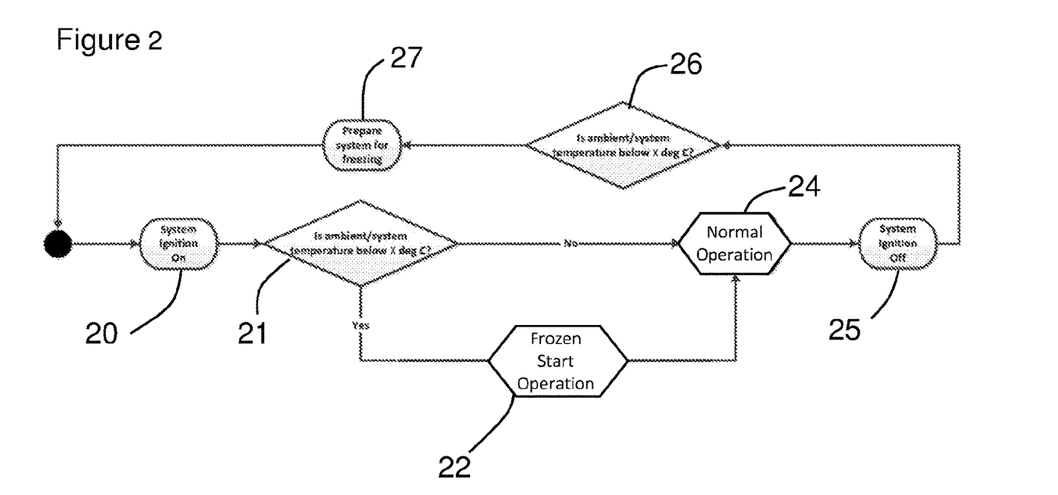
FIG. 2 shows a first flow chart illustrating operation in cold or freezing ambient conditions.
Figure 3:
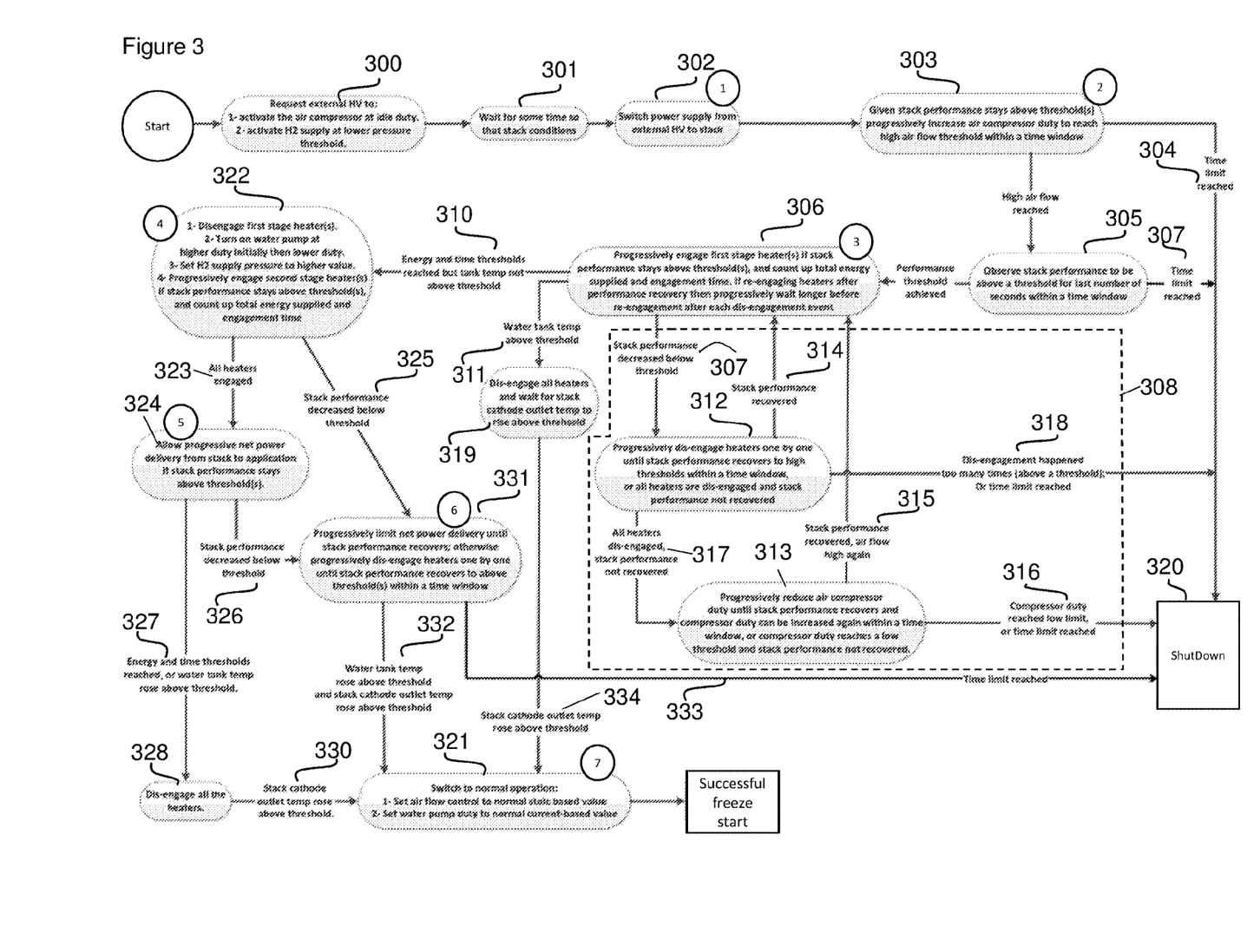
FIG. 3 shows a second flow chart illustrating the method applied by a controller under frozen coolant conditions.

The figures show a fuel cell system 1 comprising a fuel cell assembly 2 and a coolant storage module 3. The fuel cell assembly 2 in this example comprises a fuel cell stack including a plurality of proton exchange membrane fuel cells stacked together. The fuel cell assembly 2 comprises an evaporatively cooled fuel cell assembly. In this example, the coolant comprises water, although it will be appreciated that other coolants could be used such as glycol or aqueous solutions. The coolant or water storage module 3, in this example, stores pure water for the hydration and/or evaporative cooling of the fuel cell assembly 2.

In the event of freezing conditions, the water in the module 3 may freeze. The system 1 may not include or may not use an auxiliary heater to maintain an above-freezing temperature while the system 1 is powered down. On restarting the system 1, water may be required for cooling the fuel cell stack 2 and/or hydration of fuel cell membranes that form the fuel cells of the stack. Thus, if the water in the tank 1 is frozen, it must be thawed quickly so that it is available to the stack 3.

The fuel cell assembly 2 is configured to receive a flow of fuel, such as hydrogen, through an anode inlet 4 and a flow of oxidant, such as air, through a cathode inlet 5. A compressor 15 may be provided to drive the oxidant flow. An anode exhaust 6 is provided to allow for through flow of the fuel. A cathode exhaust 7 is provided to allow for through flow of the oxidant. It will be appreciated that the exhaust flows also carry reaction by-products and any coolant/hydration liquid that may have passed through the assembly 2. The cathode exhaust 7 may include a coolant separator 8 to separate the coolant (water) from the cathode exhaust flow. The separated water may be recycled to the coolant storage module 3. It will be appreciated that while this example shows the recycling of water coolant that has passed through the stack, this invention is applicable to systems that do not recycle coolant or recycle coolant in a different way.

The coolant storage module 3 is connected to the fuel cell assembly by conduits, although it will be appreciated that the module 3 may be integrated with the fuel cells in the stack. The coolant storage module 3 is connected to the cathode inlet 5 to allow for the introduction of coolant into the cathode flow for evaporative cooling of the fuel cell assembly 2. The coolant may be introduced to the stack by a conduit separate to the cathode flow.

A fuel cell system controller 10 is provided for controlling further operations of the fuel cell system. The controller 10 may be configured to control the flow of coolant from the coolant storage module into the fuel cell assembly 2. The controller 10 may provide control signals to a pump 11 to control the delivery of water to the fuel cell assembly 2. The controller 10 may control heater elements 12, 13 located in the coolant storage module 3. The controller 10 may control the flow of fuel and/or oxidant through the fuel cell assembly 2 by control of compressors 15, 16, for example. The controller 10 may also receive one or more measures of the performance of the fuel cell assembly 2 by way of one or more sensors 14. The sensor(s) are shown generally and may comprise temperature sensors and/or electrical property measurement sensors, such as a voltmeter and/or a meter. The controller 10 may provide control signals to additional heaters located elsewhere in the system 1 to warm up other parts of the coolant delivery circuit including pipes and components that carry the coolant to and/or from the coolant storage module 3.

The heater elements 12, 13 comprise a first heater element 12 and a second heater element 13 spaced from the first. The coolant storage module 3 may comprise a plurality of coolant storage modules configured to supply coolant to the fuel cell assembly and each having one or more heater elements. The one or more heater elements may be electrically powered or combustion energy powered and comprise a heat dissipating element which may include a resistive heater or heat pipe or heat exchanger that moves heat from one part of the fuel cell system to another. For example, the compressors 15, 16 that drive oxidant through the fuel cell assembly can get warm relatively quickly after start-up of the fuel cell assembly and therefore moving heat from the compressors to the coolant storage module using a heat exchanger and working fluid and/or heat pipe may be advantageous.

Turning to FIG. 2, some aspects of an exemplary implementation of operation of a fuel cell system 1 are shown. The operation may be performed by the fuel cell system controller 10. The operation is performed to benefit the fuel cell system to effectively start when used in cold or freezing ambient conditions. In cold or freezing ambient conditions there is a risk that coolant required by the fuel cell assembly 2 may not be available because it is frozen in the coolant storage module 3. It is important for the fuel cell system to identify when there may be a risk of freezing and modify its operation accordingly to enable reliable start-up of the fuel cell system. This is particularly important when the fuel cell system 1 provides the motive power for a vehicle. A user of the vehicle will expect the fuel cell system to reliably start and be able to provide effective power for the vehicle in a wide range of operating environments. This is a challenge given that resources, such as coolant, that are required by the fuel cell assembly for efficient operation may not be, at least initially, available for use.

FIG. 2 shows the step 20 of turning the fuel cell system 1 on to operate the fuel cell assembly 2. This may include powering up of electrical systems such as controllers 10 to start the fuel cell assembly 2. This may initiate a supply of fuel and oxidant to the fuel cell assembly 2 by the inlets 4, 5 or this may be performed after step 21 discussed below.

Step 21 shows the determination of the temperature of the fuel cell system 1. Thus, the fuel cell system controller 10 may use a temperature sensor(s) 14 to determine the temperature at one or more locations around the fuel cell system, such as in the stack or water storage module 3 and/or the ambient environment around the system 1. The determined temperature or a minimum or maximum or average of a plurality of temperature measurements are compared to a predetermined temperature threshold to determine the risk of coolant being frozen. In this embodiment, the predetermined temperature threshold is set at a temperature less than 6° C. If the determined temperature is lower than the predetermined temperature the method proceeds to operate the fuel cell system using a "frozen start operation" method represented by step 22, before entering a normal operation mode, which will be discussed in more detail below. If the measured temperature is greater than or equal to the predetermined temperature, the fuel cell system is operated in a "normal operation mode" represented by step 24. In the normal operation mode, the fuel cell system may not provide power to the heater elements 12, 13, but this will be discussed in more detail below. It will be appreciated that the predetermined temperature may be 0, 1, 2, 3, 4, 5, 6, 7, 8, 9, 10° C. or some other value related to the freezing point of the coolant or one or more other freezable resources the fuel cell system requires.

Step 25 represents shut-down of the fuel cell system, such as stopping the supply of fuel and oxidant. Step 26 represents the fuel cell system controller 10 determining, using the temperature sensor(s), the temperature of the fuel cell system and/or the ambient environment around the system 1. If the detected temperature is below the temperature threshold or a different temperature threshold then a cold-shut down operation is performed represented by step 27. In a further embodiment the controller 10 may be configured to retrieve a weather forecast, by using the Internet, to determine the potential ambient temperature and the system 1 may determine whether or not to perform the cold shut-down routine 27 based on the forecast. The routine 27 may comprise activating a compressor (not shown) to blow (with air or a purge gas) any coolant or water remaining in the fuel cell assembly 2 out of the assembly 2 and possibly into the coolant storage module 3. The method then awaits restarting of the fuel cell system 1.

Turning to FIG. 3, which shows an example of a method 22 performed by the controller 10 in the event that the fuel cell system 1 is started in conditions in which there is a risk of the coolant being at least partially frozen. The "frozen start operation" method comprises, at step 300, activating the compressor 15 to provide an oxidant flow to the fuel cell assembly 2. It will be appreciated a pump or pre-pressurised oxidant may be used. Activation of the fuel flow is also provided, which may be provided by activation of a compressor 16 or pump or may be provided by opening a valve to allow a pre-pressurized fuel to flow. The electrical power for the compressor or pump or for activation of the valve may be provided by an external power source, such as an electrochemical battery. The fuel flow rate may be set to a first predetermined, low, fuel rate. The controller 10 may set the oxidant flow to a first predetermined, low, oxidant rate.

The controller 10 may then wait a predetermined wait time (step 301) before assessing the performance of the fuel cell system 1, in terms of the electrical output of the fuel cell assembly 2 reaching a pre-determined voltage threshold. It will be appreciated that other electrical performance measures may be used. If the performance of the fuel cell system meets predetermined criteria (such as a pre-determined voltage threshold), then the provision of power to the compressors/pumps 15, 16, may be switched from the electrochemical battery to the fuel cell system 1, as shown at step 302. If the criteria is not met, then the controller may wait a further time, which may be shorter or longer than the predetermined wait time, before reassessing the performance of the fuel cell system.

The controller 10, at step 303, is configured to provide for increasing the oxidant flow rate, such as by control of the compressor 15. The controller 10 is configured to monitor the performance of the fuel cell and, in particular, its electrical output performance, while the air compressor 15 progressively increases the oxidant flow rate to a second predetermined, high, oxidant rate within a predetermined time window. If the performance falls below a performance threshold, the controller may be configured to provide for the control of the compressor 15 to reduce the electrical burden on the fuel cell assembly 2. Thus, the controller 10 may perform one or more of the following;

control the compressor to reduce the rate at which the oxidant flow rate is increased;

pause the increase in oxidant flow rate for a predetermined time;

pause the increase in oxidant flow rate until the performance threshold is reached; and reduce the oxidant flow rate by a predetermined flow rate amount.

It will be appreciated that the amount of the reduction in rate, the predetermined time and the predetermined flow rate amount may comprise a value related to the under-performance of the fuel cell assembly compared to the performance threshold.

The performance threshold may be based on a voltage output of the fuel cell assembly 2 and/or the voltage across one (or a subset) of the fuel cells of the fuel cell assembly 2. In this example, the controller will continue the progressive increase in oxidant flow rate provided that the voltage output of the fuel cell assembly 2 is above a compressor-ramp-up-assembly voltage threshold; and the voltage across the fuel cell of the fuel cell assembly that has the lowest voltage of the assembly is above a compressor-ramp-up-cell voltage threshold.

Otherwise, the controller 10 may provide for the reduction of the electrical burden. Accordingly, the controller 10 may provide for closed-loop feedback during the increase on oxidant flow rate from the first to the second predetermined oxidant rate.

If the compressor, during step 303, cannot reach the second predetermined, high, oxidant rate within the predetermined time window, the fuel cell system may be shut down, as shown at step 304, 320.

Step 305 shows the second predetermined oxidant rate having been reached and the controller leaving the closed-loop feedback illustrated by step 303.

The controller is configured to wait for a predetermined time period once the second predetermined oxidant rate has been reached, as shown at step 305. During this wait period, the controller checks if;

the voltage output of the fuel cell assembly 2 is above a compressor-ramped-up-assembly voltage threshold; and the voltage across the fuel cell of the fuel cell assembly that has the lowest voltage of the assembly is above a compressor-ramped-up-cell voltage threshold;

for a last predetermined time period before proceeding (to step 306). If the criteria a) or b) are not met for the last predetermined time period, the controller may shut down the fuel cell system as shown at step 307.

The compressor-ramped-up-assembly voltage threshold may be higher than the compressor-ramp-up-assembly voltage threshold. The compressor-ramped-up-cell voltage threshold may be higher than the compressor-ramp-up-cell voltage threshold. In other examples, the above thresholds may be the same as their respective compressor-ramp-up thresholds.

The last predetermined time period may be less than 5, 10, 15, 20 or more seconds, such as substantially 15 seconds.

The controller 10 then provides for progressive activation (step 306) of one or more heaters 12. The heaters may be activated sequentially (individually or in groups) with a heater-on-pause time period in between activations. In this example, the heaters are located within the coolant storage module but in other examples they may be external to the module 3 but provide heat thereto. Further, the heater 12 represents two independently controllable sections, effectively acting as two separate heater elements. In this example, the controller 10 is configured to activate the sections of the heater element 12 sequentially. The controller 10 may send an instruction to a heater switch to provide power to the heater or the controller 10 may send power to the heater directly. The power for the heaters may be partially or completely obtained from the electrical energy generated by the fuel cell assembly. The progressive activation of the one or more heaters may include progressively increasing the power supplied thereto as an alternative to or in addition to the sequential activation.

The controller 10 provides for monitoring of the performance of the fuel cell system 1 as the heaters 12 or heater sections are sequentially activated and/or once the one or more heaters 12 have been activated. In particular, the electrical performance of the fuel cell assembly and/or individual fuel cells is monitored to determine the effect of electrical load on the fuel cell assembly 2. Accordingly, action can be taken by the controller to modify the load based on the electrical performance of the fuel cell system 1 to ensure it operates within predetermined limits. This is advantageous as when the fuel cell system is cold, it may not be able to provide power as effectively as when it is warmer. Therefore, management of the load on the fuel cell system 1 at the point the heaters are activated is beneficial for effective start-up.

The controller 10 is configured to determine if the fuel cell performance meets a fuel cell low performance threshold (step 307) and, if the threshold is met, perform a recovery process (steps 308). The recovery process comprises at least two different recovery subroutines, as will be explained below. Whether or not the recovery process is required, the controller 10 is configured to wait for a temperature-or-energy-in criteria to be reached (steps 306, 310, 311) with the heater(s) 12 active. Thus, the controller is configured to monitor the electrical performance of the fuel cell system once the heaters have been activated and take action to control the load if required, until the temperature-or-energy-in criteria is reached.

The temperature-or-energy-in criteria may include either;

the temperature of the coolant (at a single or multiple points) in the coolant storage module is above a second predetermined temperature threshold (step 311); or the energy provided to the one or more heaters 12 since their activation at step 306 reaches or exceeds a predetermined heater energy threshold and the time since their activation reaches or exceeds a predetermined heater time threshold and/or the temperature of cathode exhaust exceeds a predetermined cathode exhaust temperature threshold (step 310).

The second predetermined temperature threshold may be higher than or the same as the predetermined temperature threshold of step 21. The second predetermined temperature threshold may be 8° C. It will be appreciated that the cathode exhaust temperature may be an indicator of the internal temperature of the fuel cell assembly and therefore may be accompanied or replaced with other measurement of internal fuel cell assembly temperature and surrounding temperatures.

If the temperature of the coolant in the coolant storage module is above the second predetermined temperature threshold, the method may proceed to step 319 in which the first heaters 12 are disengaged. The controller 10 may then wait for the cathode exhaust temperature to reach a predetermined cathode exhaust temperature (step 334) before proceeding to a normal operation mode 24.

The fuel cell low performance threshold (step 307), in this embodiment, comprises;
the voltage output of the fuel cell assembly 2 is below a first predetermined assembly voltage threshold; and
the voltage across the fuel cell of the fuel cell assembly that has the lowest voltage of the assembly is below a first cell voltage threshold.

It will be appreciated that only one or both of the conditions (a) and (b) may be used as part of the fuel cell low performance threshold.

The first predetermined assembly voltage threshold may be less than the compressor-ramped-up-assembly voltage threshold. The first predetermined assembly voltage threshold may be substantially the same as the compressor-ramp-up-assembly voltage threshold. The first cell voltage threshold may be less than the compressor-ramped-up-cell voltage threshold and/or the compressor-ramp-up-cell voltage threshold.

The controller 10, on determining that the fuel cell low performance threshold is met performs the recovery process 308, comprising a first recovery routine (step 312) and, if the electrical performance of the fuel cell system does not recover sufficiently, a further recovery routine 313. The first recovery routine, in summary, comprises deactivating heaters to reduce the load in the fuel cell assembly. The further recovery routine comprises, in summary, controlling the compressor 15 for oxidant flow to reduce the load on the fuel cell assembly 2. The first recovery routine, in this example, does not change the compressor 15.

Thus, step 312 comprises progressively deactivating one or more of the heaters 12 (or heater sections in this example) while assessing whether or not a fuel cell performance threshold is met. The fuel cell performance threshold comprises, in this example; the voltage output of the fuel cell assembly 2 is above a second predetermined assembly voltage threshold; and the voltage across the fuel cell of the fuel cell assembly that has the lowest voltage of the assembly is above a second cell voltage threshold.

It will be appreciated that only one or both of the conditions (a) and (b) may be used as part of the fuel cell low performance threshold.

If the criteria are met (step 314), then the controller returns to step 306. In particular, the controller is configured to wait a first predetermined time before reactivating any deactivated heaters or continue to progressively activate (and/or increase power to) the heaters if the controller was interrupted during the progressive activation of heaters (return step 314). Thus, this step represents the electrical performance of the fuel cell assembly 2 recovering after deactivation of (and/or reduction of power to) one or more of the heaters. As the fuel cell assembly will consequently be warming by being operational and will therefore become more resilient to electrical loads, the controller 10 may then try to continue with the activation of heaters and/or wait until the temperature-or-energy-in criteria is met, such as if there are no further heaters to activate. In other examples, the controller may not just wait for the temperature-or-energy-in criteria to be met rather than activate or reactivate further heaters.

The controller 10 may be configured to perform the further recovery routine 313 if the fuel cell performance threshold mentioned above (step 312, 314) is not met before the first predetermined time. In this example, however, the controller 10 may only perform the further recovery routine 313 if the measure of fuel cell system performance has not recovered despite the deactivation of the one or more heaters at step 312.

The further recovery routine 313 may be only performed by the controller 10 if the condition at step 312 is not satisfied despite deactivation of all of the heaters. In other examples, the condition to be met before the controller provides the further recovery routine 313 may be based on a second low performance threshold.

The second low performance threshold, in this embodiment, comprises;
the voltage output of the fuel cell assembly 2 is below a fifth predetermined assembly voltage threshold; and
the voltage across the fuel cell of the fuel cell assembly that has the lowest voltage of the assembly is below a fifth cell voltage threshold.

It will be appreciated that only one or both of the conditions (a) and (b) may be used as part of the second low performance threshold.

The fifth predetermined assembly voltage threshold may be less than the first predetermined assembly voltage threshold. The fifth predetermined cell voltage threshold may be substantially the same as (or less than) the first predetermined cell voltage threshold.

The further recovery routine 322 comprises progressively reducing the compressor (i.e. the power supplied to it or its setting) until the performance of the fuel cell system recovers.

However, more generally, the controller determines whether the fuel cell performance meets a fuel cell performance threshold that comprises, in this example;
the voltage output of the fuel cell assembly 2 is above a third predetermined assembly voltage threshold (which, in this example is the same as the second predetermined assembly voltage threshold); and
the voltage across the fuel cell of the fuel cell assembly that has the lowest voltage of the assembly is above a third cell voltage threshold (which, in this example is the same as the second predetermined cell voltage threshold).

It will be appreciated that only one or both of the conditions (a) and (b) may be used as part of the fuel cell low performance threshold.

If this threshold is met, then the controller 10 is configured to increase the compressor to its former setting over a predetermined compressor return time period. A closed-loop feedback may be used with the fuel cell performance threshold to control the rate of increase in returning the compressor to its former setting. Once the compressor has been returned to its former setting, in this example, the controller returns to step 306. Thus, the controller reactivates deactivated heaters or continue to progressively activate (and/or increase power to) the heaters if the controller was interrupted during the progressive activation of heaters (return step 315). Thus, this step represents the electrical performance of the fuel cell assembly 2 recovering after deactivation of one or more of the heaters and control of the oxidant compressor.

If the further recovery routine is unsuccessful, the controller 10 may determine that there is a problem with the fuel cell system and limit the electrical output of the fuel cell assembly, such as by shutting down the system 1 (step 316).

This may be considered to be a low performance threshold being met after deactivation of one or more heaters. In this example, this may occur if;

the compressor is decreased to a low level threshold without the fuel cell performance threshold being reached;

the compressor cannot be returned to its former setting within the predetermined compressor return time period while maintaining a performance above the fuel cell performance threshold.

In this example, the controller 10 is configured to perform a second recovery routine. The second recovery routine may be performed after the first recovery routine has been performed. The second recovery routine may be performed after the first recovery routine and if the fuel cell low performance threshold at step 313 is again satisfied (i.e for a second time at step 306, 307).

In general, the second recovery routine is the same as the first recovery routine and comprises progressively deactivating one or more of the heaters 12 (or heater sections in this example) while assessing whether or not a fuel cell performance threshold is met. The fuel cell performance threshold comprises, in this example;

the voltage output of the fuel cell assembly 2 is above a second predetermined assembly voltage threshold; and the voltage across the fuel cell of the fuel cell assembly that has the lowest voltage of the assembly is above a second cell voltage threshold.

It will be appreciated that only one or both of the conditions (a) and (b) may be used as part of the fuel cell low performance threshold.

Further, the controller 10 may, at step 312, wait a third predetermined time, longer than the first predetermined time, before assessing whether or not a fuel cell performance threshold is met. In summary, the controller is configured to wait a longer time for the fuel cell performance threshold to be met after each time the fuel cell assembly meets the low performance threshold. In this example, the controller returns to step 306 as part of the second recovery routine. The fuel cell performance threshold comprises, in this example;

the voltage output of the fuel cell assembly 2 is above a fourth predetermined assembly voltage threshold (which in this example is the same as the second predetermined assembly voltage); and the voltage across the fuel cell of the fuel cell assembly that has the lowest voltage of the assembly is above a fourth cell voltage threshold (which in this example is the same as the second predetermined cell voltage).

It will be appreciated that only one or both of the conditions (a) and (b) may be used as part of the fuel cell low performance threshold.

If the criteria are met (step 314), then the controller returns to step 306. However, on returning to the step 306 after the second recovery routine, the controller may be configured to wait a longer period of time (than when returning to step 306 from the first recovery routine) before proceeding with activation/reactivation (and/or re-increasing power supplied to) of the heaters as provided for in step 306. Thus, the controller is configured to reactive deactivated heaters or continue to progressively activate the heaters if the controller was interrupted during the progressive activation of heaters. Thus, this step represents the electrical performance of the fuel cell assembly 2 recovering after deactivation of one or more of the heaters. As the fuel cell assembly will hopefully be warming by being operational and will therefore become more resilient to electrical loads, the controller 10 may then try to continue with the activation of heaters and/or wait until the temperature-or-energy-in criteria is met.

The controller 10 may be configured to perform the further recovery routine 313 if the fuel cell performance threshold mentioned above (step 312) in relation to the second recovery routine is not met before the third predetermined time or all of the heaters have been deactivated.

Thus, in summary, the controller may, based on the fuel cell low performance threshold (step 307), progressively deactivate (and/or reduce the power supplied to) one or more heaters in an attempt to allow the electrical performance of the fuel cell system to recover to a fuel cell performance threshold (step 312), and, if the electrical performance of the fuel cell system falls below a second low performance threshold (step 317) control the compressor 25 that drives oxidant to reduce the load on the fuel cell assembly. If any of the recovery routines are successful, the controller returns to progressively activating heaters (step 306) and/or waiting until a temperature-or-energy-in criteria is met. If all of the recovery routines above fail, or if a predetermined number of first, second and any other non-further recovery routines are performed, or if a time-out period is reached (step 318), then the controller 10 may be configured to shut down (step 320) the fuel cell system 1.

Once the temperature-or-energy-in criteria is satisfied (step 310, 311) the controller proceeds either to a normal operation mode 24 or to activation of the coolant pump 11. In particular, when the temperature of the coolant in the coolant storage module is above a second predetermined temperature threshold (step 311) the controller proceeds to the normal operation mode 24, presuming no further heating from heaters is required. The coolant pump duty is activated and set to a normal operational level. Otherwise, once the energy provided to the one or more heaters 12 since their activation at step 306 reaches or exceeds the predetermined heater energy threshold and the time since their activation reaches or exceeds the predetermined heater time threshold (step 310) the method proceeds to a second (coolant heating) phase, the start of which is represented by step 322, in which the coolant pump 11 is activated.

In this example, the coolant pump 11 is initially set to a higher than normal duty to overcome any adverse resistance due to cold temperature and to prime the coolant circuit faster. The duty of the coolant pump 11 may, after such an initial period be reduced to a predetermined level.

As mentioned above, the first heater 12 may be representative of a plurality of first heaters. Likewise, the second heater 13 may be representative of a plurality of second heaters. The first and second heaters 12, 13 may differ in the location in the coolant storage module 3 to which they deliver heat. The controller may be configured to activate the second heater(s) 13 in addition to or instead of the first heater(s) 12 in the second phase. It will be appreciated that activation of the coolant pump 11 may be considered the end of the first phase and the start of a second phase. In this example, the first heater 12 is deactivated at the start of the second phase.

The transition to the second phase is based on the presumption by the controller (or by measurement) that thawed coolant is available for delivery to the fuel cell assembly 2 and of sufficient quantity for hydration and/or cooling. Thus, the controller 10 may be configured to prime the coolant delivery conduits by setting the coolant pump to a high flow level before reducing it to a lower cold operation flow level (step 322). The controller 10 may also increase the rate of fuel flow (step 322).

The second phase, also shown at step 322, comprises the controller 10 then providing for progressive activation of one or more heaters 13, which may be different to the heaters activated during the first stage. The heaters 13 may be activated sequentially (individually or in groups) with a heater-on-pause time period in between activations. In this example, the heaters are located within the coolant storage module but in other examples they may be external to the module 3 but provide heat thereto. Further, the heater 13 represents two independently controllable sections, effectively acting as two separate heater elements. In this example, the controller 10 is configured to activate the sections of the heater element 13 sequentially. The controller 10 may send an instruction to a heater switch to provide power to the heater or the controller 10 may send power to the heater directly. The power for the heaters may be partially or completely obtained from the electrical energy generated by the fuel cell assembly. The progressive activation of the one or more heaters may include progressively increasing the power supplied thereto as an alternative to or in addition to the sequential activation.

The controller 10 provides for monitoring of the performance of the fuel cell system 1 once the coolant pump has been activated and the second heaters 13 or heater sections are activated. While the electrical performance of the fuel cell system should improve now that a limited amount of coolant is available, the controller is configured to monitor the (electrical) performance to ensure the fuel cell assembly is not detrimentally affected by the load given the limited coolant available. In particular, the electrical performance of the fuel cell assembly and/or individual fuel cells is monitored to determine the effect of electrical load on the fuel cell assembly. Accordingly, action can be taken by the controller to modify the load based on the electrical performance of the fuel cell system 1 to ensure it operates within predetermined limits. Therefore, management of the load on the fuel cell system 1 when some but not all of the coolant required for normal operation is available is beneficial for effective start-up.

Once all the heaters 13 are successfully engaged (step 323) after the progressive activation of step 322 and the stack performance is sustained at above a threshold level, additional power may be drawn from the stack and delivered to any application system (step 324). This step 324 may represent the first supply of power to the application rather than to "internal" systems of the fuel cell system since cold-start up routine 22 began. This power supplied to the application is typically referred to as fuel cell system net power which is not used by the fuel cell assembly itself but consumed by an application system which the fuel cell assembly can provide power to.

The controller 10 is then configured to wait for a further temperature-or-energy-in criteria to be reached (step 327). Thus, the controller 10 is configured to monitor the electrical performance of the fuel cell system once the coolant pump 11 and heaters 13 have been activated and take action to control the load if required, until the further temperature-or-energy-in criteria is reached.

The further temperature-or-energy-in criteria comprises either;
the temperature of the coolant in the coolant storage module is above a third predetermined temperature threshold (step 327); or
the energy provided to the one or more heaters 13 since their activation at step 331 reaches or exceeds a predetermined heater energy threshold and the time since their activation reaches or exceeds a predetermined heater time threshold (step 327).

The heater energy threshold may be the same as the heater energy threshold of step 310, although in this example the heater energy threshold is less than the heater energy threshold of step 310. The heater time threshold in this example is less than the heater time threshold of step 310. The thresholds of part (b) may be less because firstly some of the energy supplied in the first phase has been conducted from the thawed section (around the heater 12) to the possible still frozen section (around heater 13), and also because once coolant is flowing, heated coolant may be returned to the coolant storage module to aid thawing. The third predetermined temperature threshold may be the same as the first or higher or lower.

Once the further temperature-or-energy-in criteria is met, the controller 10 knows that the coolant temperature is above the third predetermined temperature threshold (if a temperature sensor in the coolant module indicates such) or presumes that enough coolant has been thawed (based on the energy supplied to the heaters and the time they have been active) and therefore deactivates any active heaters 12, 13 (step 328). The controller may then proceed with the normal operation mode 24, which may require setting the coolant flow rate to a normal operation flow level greater than the cold operation flow level and controlling the fuel flow and/or oxidant flow to obtain a desired stoichiometric ratio. The controller 10 may, before returning to normal operation mode 24 (shown as step 321), check the temperature of fluid leaving the cathode exhaust 7 is above a predetermined cathode outlet temperature (step 330). If the temperature is below the predetermined cathode outlet temperature then the controller may wait before returning to normal operation.

The controller 10, in the second phase, is configured to determine a whether or not the fuel cell performance falls below a further fuel cell low performance threshold (steps 325 and 326). The fuel cell performance is monitored both while the progressive activation of the heaters is underway in step 322 and once net power is supplied to the application in step 324.

If the further low performance threshold is met, the controller is configured to perform a further recovery process (step 331).

The further fuel cell low performance threshold (steps 325 and 326), in this embodiment, comprises;
the voltage output of the fuel cell assembly 2 is below a seventh predetermined assembly voltage threshold; and
the voltage across the fuel cell of the fuel cell assembly that has the lowest voltage of the assembly is below a seventh cell voltage threshold.

It will be appreciated that only one or both of the conditions (a) and (b) may be used as part of the fuel cell low performance threshold.

Since at this stage the fuel cell assembly is operating with available coolant flow the seventh predetermined assembly voltage threshold may comprise a substantially higher value than the compressor-ramped-up-assembly voltage threshold. Similarly the seventh cell voltage threshold may comprise substantially a higher value than the compressor-ramped-up-cell voltage threshold.

If the further fuel cell low performance threshold is reached the further recovery process 331 comprises limiting the electrical output (such as net electrical power output) if the controller has proceeded from step 324 or deactivating (or reducing the power supplied to) one or more heaters 13 if the controller has proceeded from step 322. In other examples, the limiting of the electrical output may comprise limiting the output to one or more of;
- the net power delivery to the application (for example a vehicle)
- the heaters;
- the compressor for providing the oxidant flow;
- a combination of (a) to (c); or
- limiting the total electrical output of fuel cell assembly irrespective of what receives that electrical output.

The limiting of the electrical output may comprise a predetermined limitation of the electrical output, a predetermined percentage of the current electrical output, or progressively limiting the electrical output up to a predetermined limit threshold until the further low performance threshold is no longer met.

If the controller detects that the limiting of the electrical output has resulted in the low performance threshold no longer being met within a predetermined time window, the controller then waits (step 332) until the coolant temperature rises above a fourth predetermined temperature threshold and the cathode exhaust temperature is above a predetermined cathode exhaust temperature before proceeding to step 321 and proceeding to the normal operation mode 24.

If the step of limiting the electrical output of the fuel cell system performed at step 331 is insufficient to increase the electrical output or fuel cell assembly performance above the further low performance threshold within the predetermined time window, the controller is configured to shut down the fuel cell system (step 333). This may be considered to be a low performance threshold being met after deactivation of one or more heaters.

In the above description reference is made to measured values being above or below various thresholds. It will be appreciated that above a threshold may also mean equal to or above the relevant threshold and below the threshold may also mean equal to or below the relevant threshold, in accordance with the context.

The controller 10 described above need not be a single processing unit and may comprise one or more processing units arranged together or distributed over the fuel cell system or remote therefrom. The controller 10 may therefore perform some or all of the tasks described above and may provide control signals to other controllers/sensors for performing the remaining tasks described.

Although labeled with different reference numerals, it will be understood that descriptions of individual components and elements as they apply to a particular implementation may apply to all implementations unless explicitly stated otherwise.

While the disclosure has been described in connection with the various aspects of the various figures, it will be appreciated by those skilled in the art that changes could be made to the aspects described above without departing from the broad inventive concept thereof. It is understood, therefore, that this disclosure is not limited to the particular aspects disclosed, and it is intended to cover modifications within the spirit and scope of the present disclosure as defined by the claims.

Features of the disclosure that are described above in the context of separate implementations may be provided in combination in a single implementation. Conversely, various features of the disclosure that are described in the context of a single implementation may also be provided separately or in any sub-combination. Finally, while an implementation may be described as part of a series of steps or part of a more general structure, each said step may also be considered an independent implementation in itself, combinable with others.

The invention claimed is:

1. A method for operating a fuel cell system configured to generate electrical power from a fuel flow and an oxidant flow to a plurality of fuel cells in an assembly arranged in combination with a coolant storage module configured to supply the fuel cell assembly with a flow of coolant, the method comprising;
   - activating one or more heaters configured to heat frozen coolant of the coolant storage module;
   - then providing a compressor configured to provide the flow of oxidant and/or the flow of fuel, based on a low performance threshold comprising a voltage across the fuel cells of the fuel cell assembly being below a first predetermined assembly voltage threshold and/or a voltage of one or more of the fuel cells being below a first cell voltage threshold;
   - performing a first recovery routine comprising deactivating one or more of the activated heaters; and
   - provided that, within a first predetermined time, a recovery threshold is met comprising a voltage across the fuel cells of the fuel cell assembly is above a second predetermined assembly voltage threshold and/or a voltage of one or more of the fuel cells is above a second cell voltage threshold, performing a heater activation procedure that includes activating one or more of the heaters; otherwise
   - performing a further recovery routine comprising decreasing power supplied to the compressor while continuing to provide heat from the operational fuel cell assembly to the coolant storage module.

2. The method of claim 1, in which the further recovery routine further comprises waiting a second predetermined time; and
   - provided that, within a second predetermined time, a voltage across the fuel cells of the fuel cell assembly is above a third predetermined assembly voltage threshold and/or a voltage of one or more of the fuel cells is above a third cell voltage threshold, performing the heater activation procedure; otherwise
   - limit the electrical output of the fuel cell assembly.

3. The method of claim 2, in which limiting the electrical output comprises shutting down the fuel cell system.

4. The method of claim 1, in which, the method includes a second recovery routine performed if the low performance threshold is met for a second time, the second recovery routine comprising deactivating one or more of the activated heaters and
   - provided that, within a third predetermined time, a second recovery threshold is met comprising at least one of a voltage across the fuel cells of the fuel cell assembly is above a fourth predetermined assembly voltage threshold or a voltage of one or more of the fuel cells is above a fourth cell voltage threshold, performing a heater activation procedure that includes activating one or more of the heaters; otherwise
   - providing for reduction in the electrical load on the fuel cell system.

5. The method of claim 4, in which the further recovery routine is performed on the condition that a voltage across the fuel cells of the fuel cell assembly is less than a fifth predetermined assembly voltage threshold or a voltage of one or more of the fuel cells is less than a fifth cell voltage threshold for a predetermined time.

6. The method of claim 5, in which each time the low performance threshold is met and a corresponding recovery threshold is met, the method comprises waiting a longer predetermined time before performing a heater activation procedure that includes activating one or more of the heaters.

7. The method of claim 6, in which the method is performed until one or more of the following conditions is satisfied:
- the temperature of the coolant in the coolant storage module is above a predetermined temperature threshold;
- the energy provided to the heaters since their activation reaches or exceeds a predetermined heater energy threshold;
- the time since the activation of the heaters reaches or exceeds a predetermined heater time threshold;
- the temperature of cathode exhaust exceeds a predetermined cathode exhaust temperature threshold;
- the low performance threshold is met for a predetermined number of times;
- a time-out period is reached.

8. The method of claim 7, in which the method is performed in one or more of the following conditions:
- prior to any coolant being available to the fuel cell system from the coolant storage module;
- a temperature of the fuel cell system or its ambient environment being below a temperature threshold;
- prior to activation of a coolant pump configured to pump coolant from the coolant storage module;
- until a measure of the energy provided to coolant storage module reaches or exceeds a predetermined energy-in threshold;
- until the time over which power is supplied to the heaters reaches or exceeds a predetermined energy-in time threshold;
- the temperature of the oxidant flow leaving the fuel cell system reaches or exceeds a predetermined cathode temperature threshold.

* * * * *